(12) United States Patent
De Groot et al.

(10) Patent No.: US 11,105,054 B2
(45) Date of Patent: Aug. 31, 2021

(54) DEVICE FOR DELIVERING TRAFFIC CONES AND VEHICLE COMPRISING SUCH DEVICE

(71) Applicant: Verdegro Holding B.V., Etten-Leur (NL)

(72) Inventors: Sjoerd De Groot, Etten-Leur (NL); Gerrit Verwijs, Etten-Leur (NL)

(73) Assignee: VERDEGRO HOLDING B.V., Etten-Leur (NL)

( * ) Notice: Subject to any disclaimer, the term of this patent is extended or adjusted under 35 U.S.C. 154(b) by 0 days.

(21) Appl. No.: 16/537,451

(22) Filed: Aug. 9, 2019

(65) Prior Publication Data

US 2020/0048849 A1 Feb. 13, 2020

(30) Foreign Application Priority Data

Aug. 10, 2018 (NL) ...................................... 2021455

(51) Int. Cl.
  *E01F 9/70* (2016.01)
  *B60P 1/42* (2006.01)
  *B65G 59/10* (2006.01)
  *E01F 9/654* (2016.01)

(52) U.S. Cl.
  CPC .................................. *E01F 9/70* (2016.02); *B60P 1/42* (2013.01); *B65G 59/10* (2013.01); *E01F 9/654* (2016.02)

(58) Field of Classification Search
  CPC ... E01F 9/70; B60P 1/42; B65G 33/04; B65G 33/06; B65G 47/82; B65G 59/10
  USPC .................................................. 414/468, 551
  See application file for complete search history.

(56) References Cited

U.S. PATENT DOCUMENTS

| 2,919,830 | A | * | 1/1960 | Anderson | B65G 59/10 |
| | | | | | 221/11 |
| 4,166,408 | A | * | 9/1979 | Wetzel | B65G 33/04 |
| | | | | | 198/778 |
| 4,597,706 | A | * | 7/1986 | Michit | E01F 9/654 |
| | | | | | 414/788.2 |
| 5,297,668 | A | * | 3/1994 | Zink | B65G 21/18 |
| | | | | | 198/724 |
| 5,525,021 | A | | 6/1996 | Larguier | |
| 6,092,641 | A | * | 7/2000 | Draghetti | B65G 47/24 |
| | | | | | 198/406 |

(Continued)

FOREIGN PATENT DOCUMENTS

| CN | 105714707 A | 6/2016 |
| CN | 106320214 A | 1/2017 |

(Continued)

*Primary Examiner* — James Keenan
(74) *Attorney, Agent, or Firm* — McCoy Russell LLP

(57) ABSTRACT

Device for delivering traffic cones that have a cone mantle that comprises a flange at its broadest end, comprising a repository for the traffic cones, comprising an outer drum and an inner drum, both arranged coaxially about the same length axis with respect to each other and mutually rotatable with respect to each other about said same axis wherein one of the inner and outer drum comprises a helix shaped groove at a side facing the other of the inner and outer drum, and the other of the inner and outer drum comprises a blocking, for at least partly prohibiting movement of a cone in the direction of the mutual movement of the inner and outer drum and a drive for mutually rotating the inner and outer drum.

13 Claims, 5 Drawing Sheets

(56) References Cited

U.S. PATENT DOCUMENTS

| | | | |
|---|---|---|---|
| 6,435,369 B1 * | 8/2002 | Poursayadi | E01F 9/70 221/185 |
| 7,431,532 B2 | 10/2008 | Lidster | |
| 2006/0147264 A1 | 7/2006 | Doran, Jr. | |
| 2007/0071584 A1 * | 3/2007 | Beckstead | E01F 9/70 414/467 |
| 2011/0259709 A1 * | 10/2011 | Grossmann | B67C 3/242 198/339.1 |
| 2020/0370255 A1 * | 11/2020 | Mettler | E01F 9/70 |

FOREIGN PATENT DOCUMENTS

| | | | | |
|---|---|---|---|---|
| CN | 107804210 A | | 3/2018 | |
| FR | 2942812 A1 * | | 9/2010 | E01F 9/70 |

\* cited by examiner

DEVICE FOR DELIVERING TRAFFIC CONES AND VEHICLE COMPRISING SUCH DEVICE

CROSS REFERENCE TO RELATED APPLICATIONS

The present application claims priority to Dutch Patent Application No. 2021455, entitled "DEVICE FOR DELIVERING TRAFFIC CONES AND VEHICLE COMPRISING SUCH DEVICE", and filed on Aug. 10, 2018. The entire contents of the above-listed application are hereby incorporated by reference for all purposes.

TECHNICAL FIELD

The present invention relates to a device for delivering traffic cones. Traffic cones or construction cones or deviation cones are widely used to temporarily mark roads or construction sites or to temporarily block lanes.

BACKGROUND AND SUMMARY

For that purpose, they are usually placed on a road surface, which may be done manually, which is a cumbersome task if the construction covers multiple kilometers, but semi- and full automated systems exist as well. A semi-automated system is described in U.S. Pat. No. 7,431,532. Examples of fully automated systems can be found in Chinese patent applications CN107804210, CN106320214 and CN105714707 that seem to form the closest prior art.

These systems comprise a repository and a placement device, and fulfil a certain need, be it that the delivery from the repository is a mechanically complex solution in the cases shown, which slows down the placement of the cones, is susceptible to interference and has further disadvantages when it comes to refilling the repository.

It is therefore a goal of the present invention to provide a system for delivering traffic cones that takes away the disadvantages mentioned, and/or provides a useful alternative to the state of the art.

The invention thereto proposes a device for delivering traffic cones that have a cone mantle that comprises a flange at its broadest end, comprising a repository for the traffic cones, comprising an outer drum and an inner drum, both arranged coaxially about the same length axis with respect to each other and mutually rotatable with respect to each other about said same axis wherein one of the inner and outer drum comprises a helix shaped groove at a side facing the other of the inner and outer drum, and the other of the inner and outer drum comprises a blocking, for at least partly prohibiting movement of a cone in the direction of the mutual movement of the inner and outer drum, a drive for mutually rotating the inner and outer drum. The length axis may extend in a horizontal or a vertical direction. A horizontal direction may lead to optimal use of the space available on a truck, with a vertical direction, gravity may assist in the movement of the cones.

The space enclosed by the inner and outer drum serves to store the cones. The cones may be shifted into each other and thus form laying stacks, of which the flanges are arranged in the helix shaped groove. These flanges may have an annular shape and thus the same width all around the cone, or may be of the type that forms a rectangular and in particular square base (with an annular hole from which the cone extends). The space in between the drums can be filled with multiple stacks, that may extend in the axial direction, but it is also thinkable that they have a twist/a helical arrangement as well.

The repository is operated by mutually rotating the inner and outer drum. The cones are then moved with at least an axial component by the groove which then serves as a screw. The blocking prohibits that the cones rotate along with the drums, and the combination leads to a movement with at least an axial component. Some rotation may be allowed, so the cones may follow a helical path too, but in order to obtain an axial component, they may not be able to rotate to a full extend with the drums.

In an alternative embodiment, the inner and outer drum do not rotate about the same axis, but one of them is out of the center with respect to the other one. This may allow cones to be taken out of the space between the drums at a specific position, for instance the lowest position.

Depending on the type of cone to be used, the blocking may comprise an elevation, that extends from the drum wall in a radial direction, like a ridge or a wall. A wall has the advantage that it works for any kind of cone, since it fully blocks the passage, but it may have the disadvantage that it has extra material and thus weight, and that it causes extra friction and is possibly in the way when cones get stuck and need to be released. A ridge may in those cases be a good solution.

In an embodiment that is in particular suitable for cones with a rectangular or square base, the drum comprising the blocking has a polygonal cross section. Such cross section prohibits a rotation of the stacks of cones along with the drums and provides a number of planes that form a guide for the stacks of cones. The polygonal cross section is at least present at the side facing the other drum.

Although both configurations are thinkable, in a preferred embodiment, the inner drum is provided with a helix shaped groove facing the outer drum, and the outer drum is provided with the blocking. This configuration has the advantage that less material is required to form the helix, which leads to a lower weight and thus also lower costs.

In a further embodiment, the inner drum is arranged fixed with respect to a support and the outer drum is arranged rotatable with respect to the inner drum. When the inner drum is the drum provided with the groove, which is to be preferred as described above, this configuration also appears to reduce the risk of crooked cones that may even get stuck.

In general, it may be preferred that the drum provided with the groove has a determined orientation with respect to the fixed world, since the end of the groove defines the position where the cones are delivered, and a placement device, as described later on in this application, should connect to that position in order to take over the cones, or in case the device is to be filled, to deliver the cones.

For that latter purpose, in a device according to the invention, the drive may be configured for rotating the inner and outer drum with an adjustable rotational direction with respect to each other. One direction may be used to deliver cones from the repository to a placement device and the other direction may be used to receive cones from the placement device, when the cones are picked up from the road after use. This direction may also be used for initial filling of the repository, although it is also thinkable that the repository is filled at an opposite side seen from where it delivers cones, in which case the rotational direction for delivering and filling is the same.

The invention also relates to a vehicle, comprising a device for delivering traffic cones as described above. Such vehicle may in general be a truck or a pick-up, that besides the device for delivering traffic cones comprises a placement device, for placing traffic cones on a road surface, which placement device comprises at least a movable grabber, for grabbing a traffic cone delivered by the device for delivering traffic cones, moving said cone and releasing said cone. With these subsequent steps the cone can be moved from the location where the delivery device delivers it to a road surface, and the other way round in case the vehicle is used to pick up the cones from a road after use.

The placement device may be used for subsequently dragging, sliding and lifting the cone, and may further comprise multiple grabbers, each for performing one of the drag, slide or lift movement. By providing multiple grabbers that each take care for one of the movements, multiple cones can be dealt with at the same time.

The device according to the invention may further comprise a tilting device for tilting a traffic cone prior to placing it on the road surface, in order to assure that the cone is placed with its base on the road surface. Such placement device may be configured for placing the constriction cone either left or right from the vehicle on the road surface, for instance at an operators choice. The displacement device may further be operated in reverse direction, to provide cones to the repository.

In a further embodiment the vehicle according to the invention further comprises a speed bump placement and/or pick up device, which enables to provide a complete road deposition in one go.

BRIEF DESCRIPTION OF THE DRAWINGS

The invention will now be elucidated into more detail, with reference to the following figures, that are exemplary and do in no sense limit the scope of the invention as defined by the claims, and wherein:

DETAILED DESCRIPTION

Figure 1:
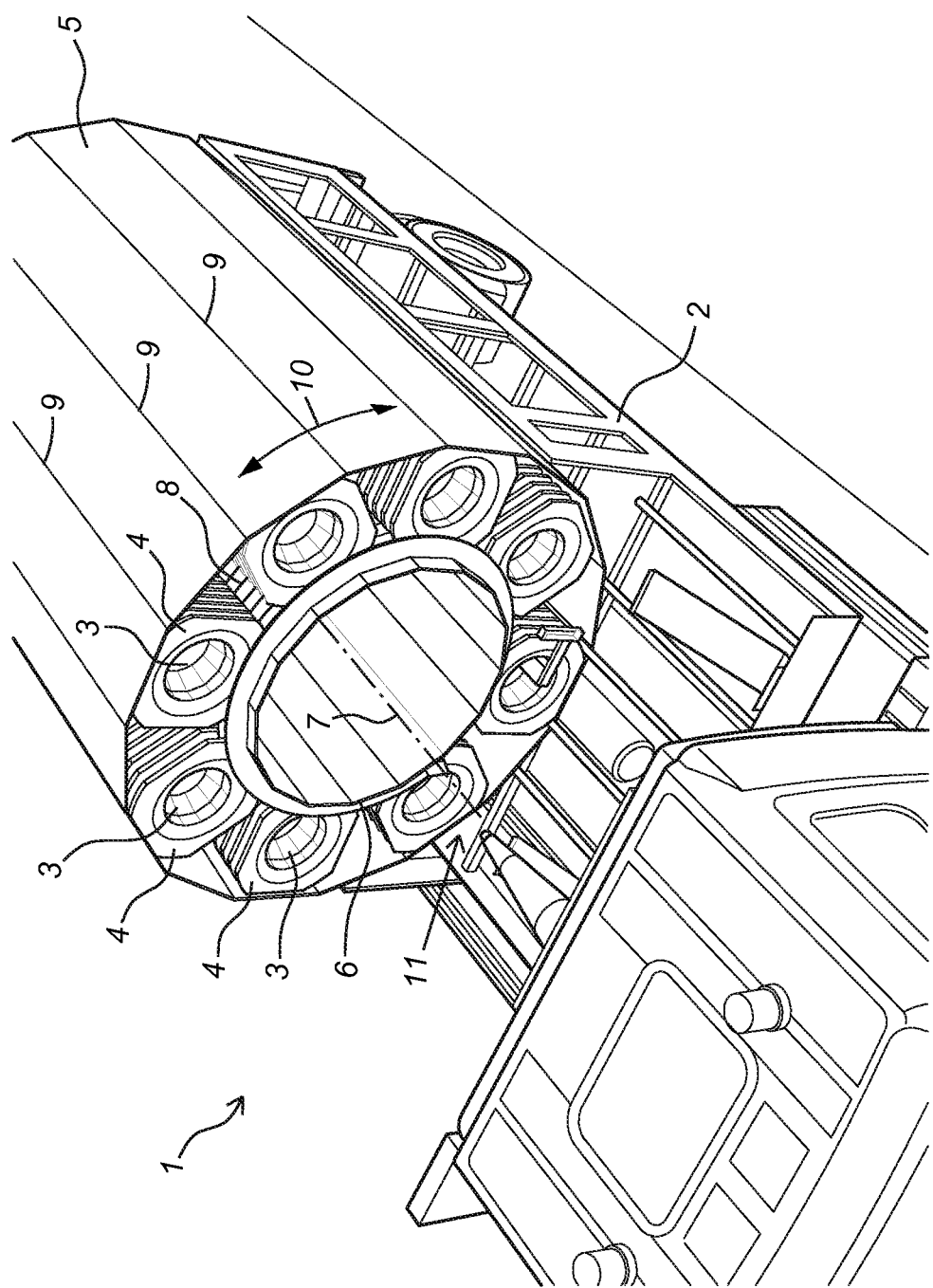
FIG. 1 shows a perspective view of a device according to the invention, mounted on a vehicle.

FIG. 1 shows a perspective view of a device 1 according to the invention, mounted on a vehicle 2. The device is for delivering traffic cones 3 that have a cone mantle that comprises a flange 4 at its broadest end, and the device comprises a repository for the traffic cones, comprising an outer drum 5 and an inner drum 6, both arranged coaxially about the same length axis 7 with respect to each other and mutually rotatable with respect to each other about said same axis 7. The inner drum 6 comprises a helix shaped groove 8 at a side facing the outer drum 5, and the outer drum comprises a blocking 9, for at least partly prohibiting movement of a cone 3 in the direction of the mutual movement 10 of the inner 6 and outer drum 5 and a drive for mutually rotating the inner 6 and outer drum 5. The blocking 9 comprises an elevation that extends from the drum wall in a radial direction, and is formed by the outer drum 5 having a polygonal cross section, that is, at least its side facing the inner drum 6. In the embodiment shown, the inner drum 6 is arranged fixed with respect to the support, being the vehicle 2, and the outer drum 5 is arranged rotatable with respect to the inner drum 6. The device comprises a drive (not shown) configured for rotating the inner and outer drum with an adjustable rotational direction 10 with respect to each other. That means, the device can be used for delivering traffic cones, but also for picking them up at the same side, in the embodiment shown the front side 11 of the vehicle.

Figure 2:
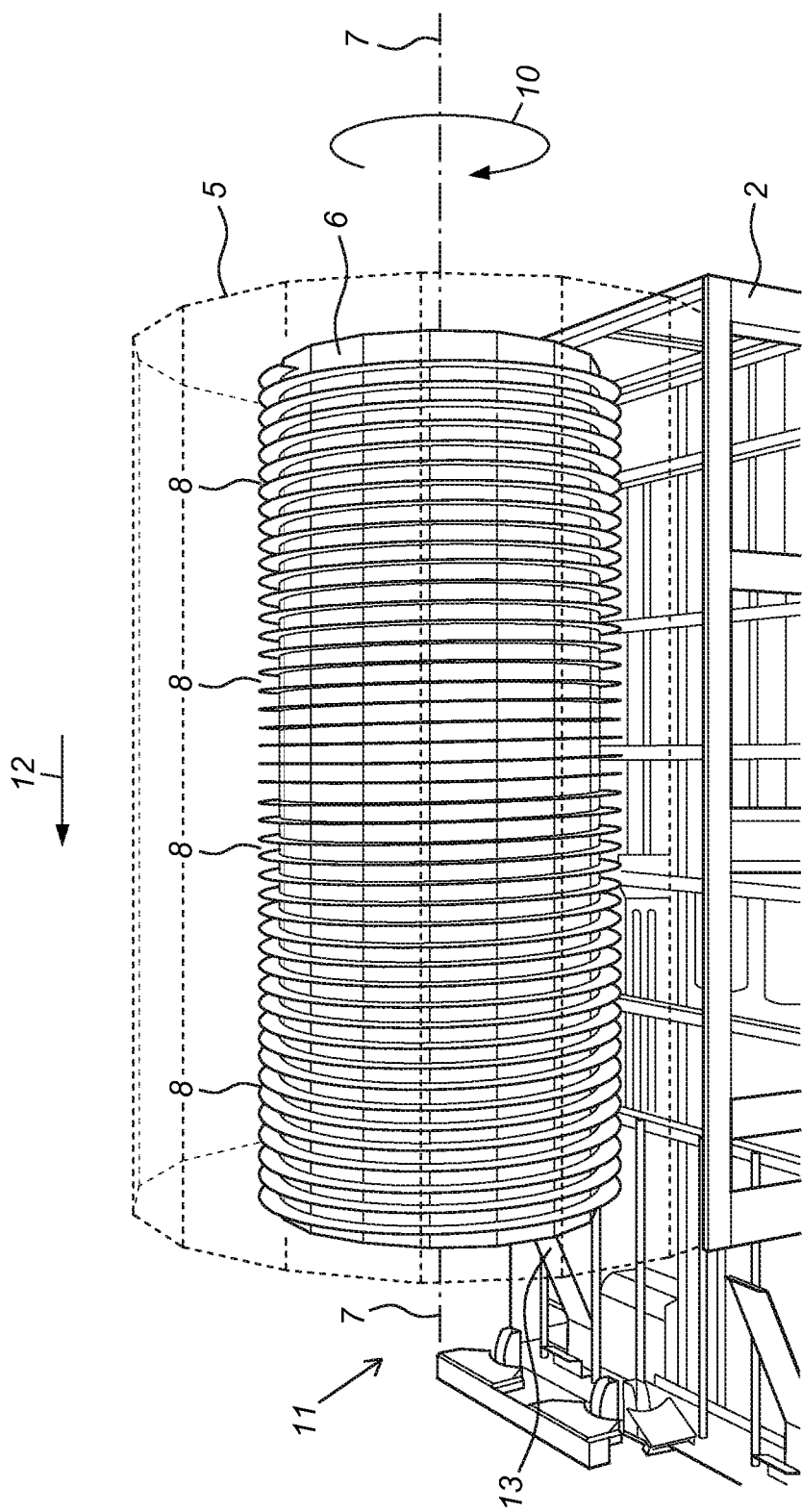
FIG. 2 shows a view of the device from FIG. 1, with a part taken away.

FIG. 2 shows a side-view on the device from FIG. 1. The outer drum 5 is depicted transparent in order to show the inner drum 6, provided with groove 8. When the outer drum 5 is rotated in the direction 10 about axis 7, cones are rotated about the inner drum 6 and since their flanges are positioned in the grooves 8, the cones are moved in the direction 12, toward the front of the vehicle. Evidently, the rear side of the vehicle may be chosen for that purpose as well. The groove 8 on the inner drum is in the example described here oriented such that a cone is dropped at a predetermined position 13, from further handling can take place by a placement device.

Figure 3:
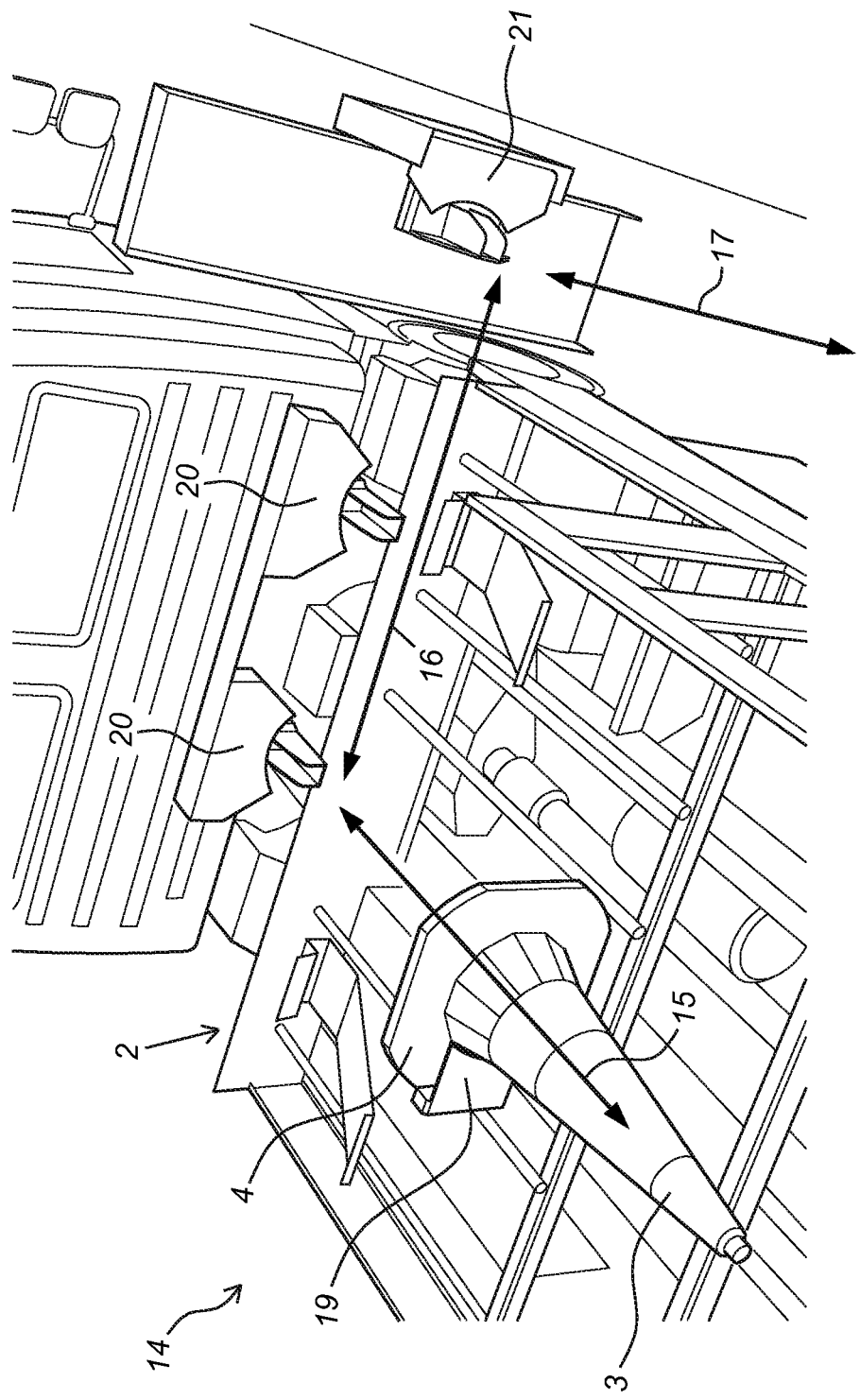
FIG. 3 shows a placement device, forming part of the present invention.

FIG. 3 shows a view on such placement device 14 configured for subsequently dragging (moving in the direction of arrow 15), sliding (moving in the direction of arrow 16) and lifting (moving in the direction of arrow 17) the cone. The displacement device comprises three grabbers 19, 20, 21, for performing respectively the drag 15, slide 16 or lift 17 movement. The grabbers 19, 20, 21 are operated subsequently and deliver a traffic cone to be placed or to be picked up.

Figure 4:
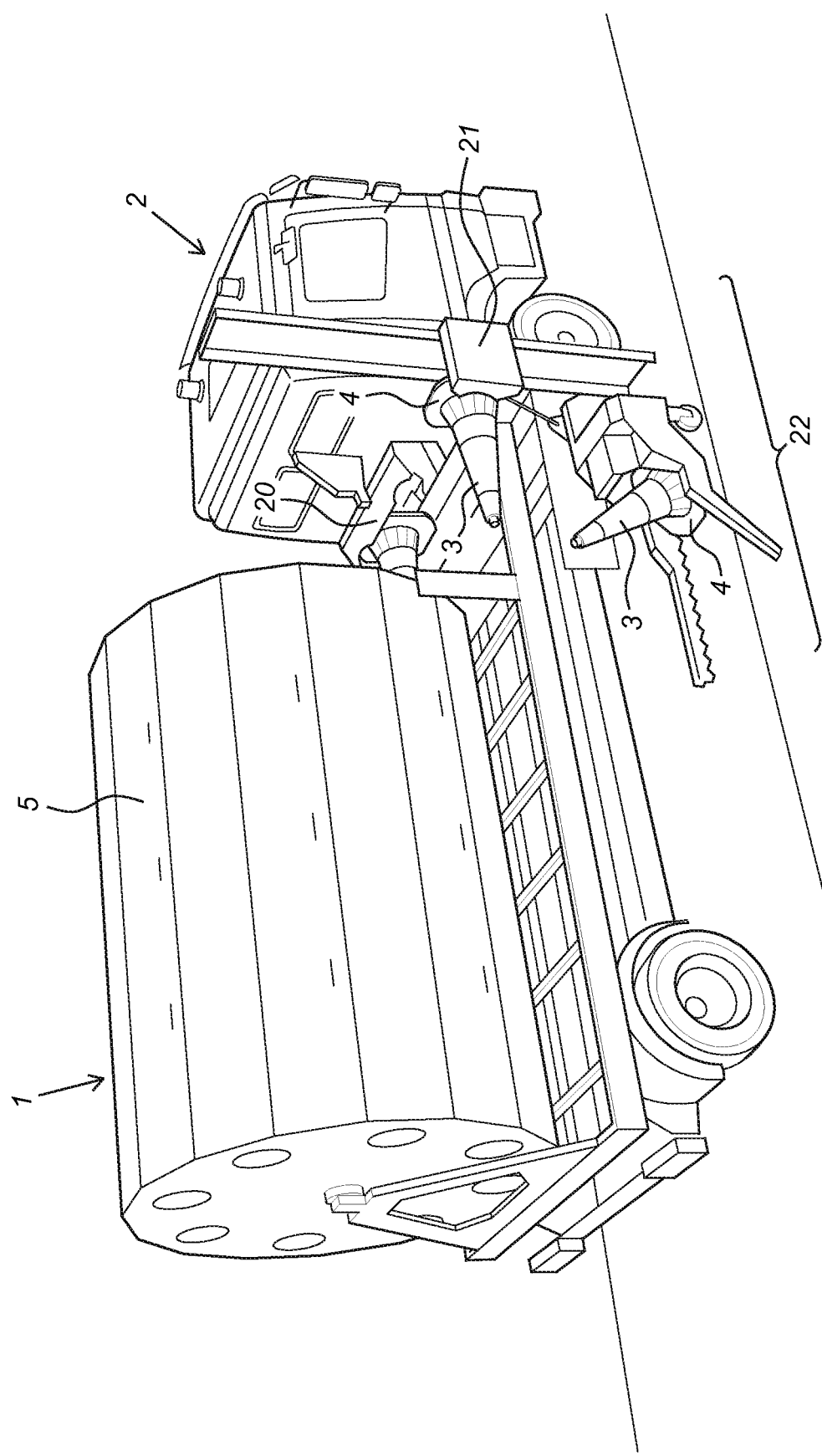
FIG. 4 shows a tilting device, forming part of the present invention.

FIG. 4 shows a device according to the invention, comprising a tilting device 22 for tilting a traffic cone prior to placing it on the road surface. In the example given, the placement device is configured for placing the constriction cone right from the vehicle on the road surface, but at operators choice, this may also be in the left side. Grabber 20 for the slide movement in the direction of arrow 17 may for that reason be embodied double. The displacement device as well as the rest of the device for delivering traffic cones may further be configured for processing traffic cones in opposite order and thus delivering them to the repository from the road surface.

Figure 5:
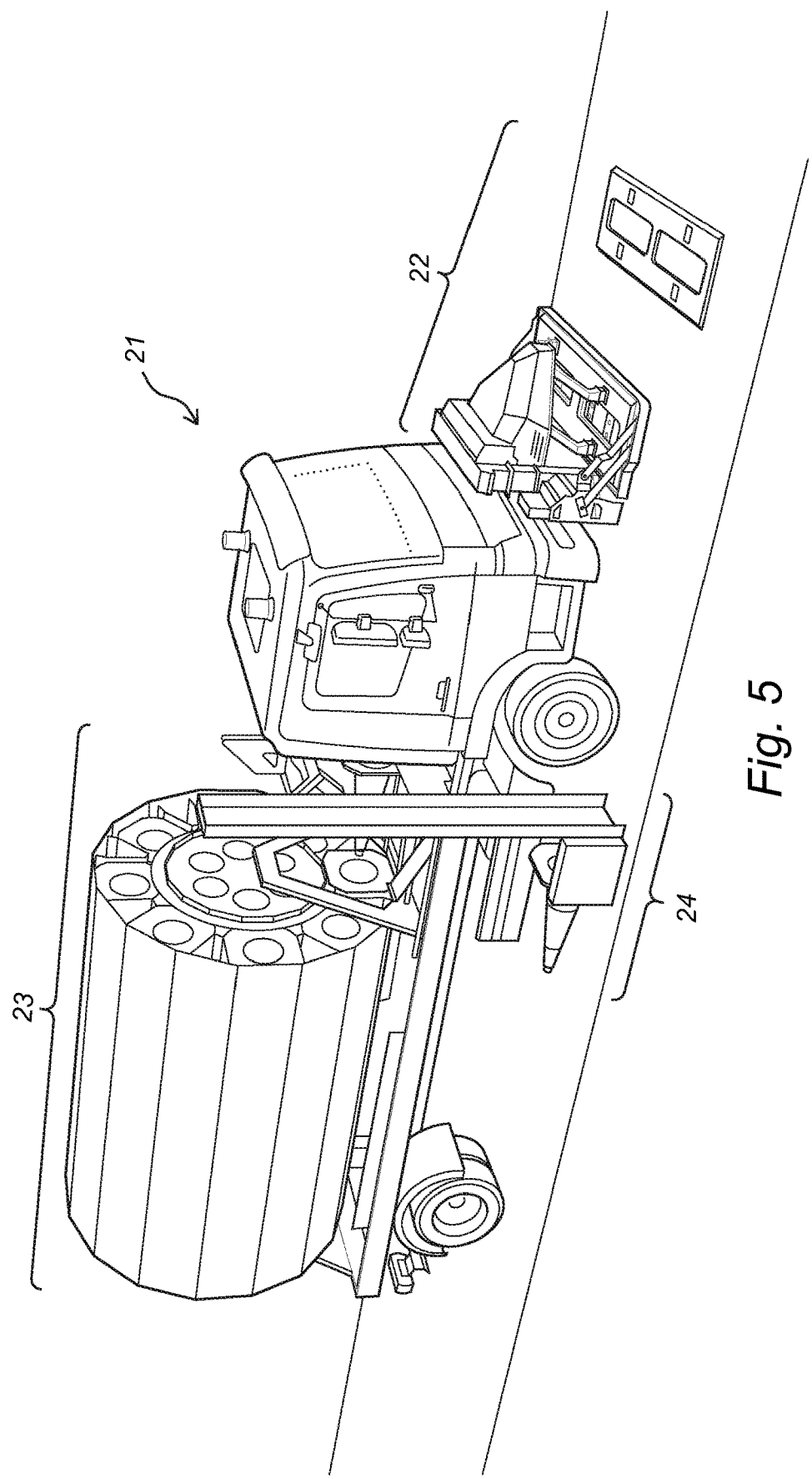
FIG. 5 shows a vehicle with a speed bump placement and/or pick up device.

FIG. 5 shows a vehicle 21 according to another embodiment of the invention, comprising a speed bump placement and/or pick up device 22, as well as a device 23 for delivering traffic cones 24.

The invention claimed is:

1. A device for delivering traffic cones that have a cone mantle that comprises a flange at its broadest end, comprising:
   a repository for the traffic cones, comprising:
     an outer drum; and
     an inner drum, both arranged coaxially about a same length axis with respect to each other and mutually rotatable with respect to each other about said same axis;
   wherein:
     one of the inner and outer drum comprises a helix shaped groove at a side facing the other of the inner and outer drum, and the other of the inner and outer drum comprises a blocking, for at least partly prohibiting movement of a cone in a direction of the mutual movement of the inner and outer drum; and
   a drive for mutually rotating the inner and outer drum.

2. The device according to claim 1, wherein the blocking comprises an elevation that extends from a wall of the outer drum in a radial direction.

3. The device according to claim 2, wherein the elevation is a ridge or a wall.

4. The device according to claim 1, wherein the drum comprising the blocking has a polygonal cross section.

5. The device according to claim 1, wherein the inner drum is provided with the helix shaped groove and the outer drum is provided with the blocking.

6. The device according to claim 1, wherein the inner drum is arranged fixed with respect to a support, and the outer drum is arranged rotatable with respect to the inner drum.

7. The device according to claim 1, wherein the drive is configured for rotating the inner and outer drum with an adjustable rotational direction with respect to each other.

8. A vehicle, comprising a device for delivering traffic cones according to claim 1.

9. The vehicle according to claim 8, comprising a placement device, for placing traffic cones on a road surface, which placement device comprises at least a movable grabber, for grabbing a traffic cone delivered by the device for delivering traffic cones, moving said cone and releasing said cone.

10. The vehicle according to claim 9, wherein the placement device is configured for subsequently dragging, sliding and lifting the cone.

11. The vehicle according to claim 10, wherein the placement device comprises multiple grabbers, each for performing one of the dragging, sliding, or lifting movement.

12. The vehicle according to claim 9, comprising a tilting device for tilting the traffic cone prior to placing it on the road surface.

13. The vehicle according to claim 9, comprising a speed bump placement and/or pick up device.

* * * * *